(12) United States Patent
Yedidia et al.

(10) Patent No.: US 8,407,550 B2
(45) Date of Patent: *Mar. 26, 2013

(54) METHOD AND SYSTEM FOR DECODING GRAPH-BASED CODES USING MESSAGE-PASSING WITH DIFFERENCE-MAP DYNAMICS

(75) Inventors: Jonathan S. Yedidia, Cambridge, MA (US); Yige Wang, Natick, MA (US); Stark C. Draper, Madison, WI (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 869 days.

This patent is subject to a terminal disclaimer.

(21) Appl. No.: 12/541,810

(22) Filed: Aug. 14, 2009

(65) Prior Publication Data

US 2011/0041029 A1  Feb. 17, 2011

(51) Int. Cl.
*G06F 11/00* (2006.01)
(52) U.S. Cl. ........................ 714/752; 714/774
(58) Field of Classification Search .............. 714/752, 714/774
See application file for complete search history.

(56) References Cited

U.S. PATENT DOCUMENTS

| | | |
|---|---|---|
| 6,771,197 B1 | 8/2004 | Yedidia |
| 6,857,097 B2 | 2/2005 | Yedidia |
| 7,103,818 B2 | 9/2006 | Yedidia |
| 7,103,825 B2 | 9/2006 | Yedidia |
| 7,191,376 B2 | 3/2007 | Yedidia |
| 7,373,585 B2 | 5/2008 | Yedidia |
| 7,376,173 B2 | 5/2008 | Yedidia |
| 2006/0048038 A1 | 3/2006 | Yedidia |
| 2006/0123241 A1 | 6/2006 | Martinian |
| 2007/0174633 A1 | 7/2007 | Draper |
| 2007/0217432 A1 | 9/2007 | Molisch |
| 2008/0052594 A1 | 2/2008 | Yedidia |
| 2008/0235515 A1 | 9/2008 | Yedidia |
| 2008/0244368 A1* | 10/2008 | Chin et al. ............ 714/800 |
| 2008/0316069 A1 | 12/2008 | Draper |
| 2009/0063933 A1* | 3/2009 | Richardson et al. ...... 714/763 |

OTHER PUBLICATIONS

F.R. Kschischang, B.J. Frey, and H.-A. Loeliger, "Factor Graphs and the Sum-Product Algorithm," IEEE Transactions on Information Theory, vol. 47, pp. 498-519, 2001.
T. Richardson, "Error Floors of LDPC Codes," Proceedings of the 41st Allerton Conference on Communications, Control, and Computing, 2003.
Y. Han and W.E. Ryan, "Low-floor decoders for LDPC Codes," Proceedings of the $45^{th}$ Annual Allerton Conference on Communications, Control, and Computing 2007, pp. 473-479.
Y. Wang, J.S. Yedidia, and S.C. Draper, "Multi-stage Decoding Via Mixed-Integer Adaptive Linear Programming," Proceedings of the IEEE International Symposium on Information Theory, 2009, pp. 2151-2155.
Gravel and Elser, "Divide and Concur: a General Approach to Constraint Satisfaction," Phys. Rev. E 78, 036706, 2008.
Simon Gravel, PhD, "Using Symmetries to Solve Asymmetric Problems," Cornell University 2009 Dissertation.

* cited by examiner

*Primary Examiner* — Scott Baderman
*Assistant Examiner* — Jigar Patel
(74) *Attorney, Agent, or Firm* — Gene Vinokur; Dirk Brinkman

(57) ABSTRACT

A code to be decoded by message-passing is represented by a factor graph. The factor graph includes variable nodes indexed by i and constraint nodes indexed by a connected by edges for transferring messages $m_{i \to a}$ outgoing from the variable nodes to the constraint nodes and messages $m_{a \to i}$ incoming from the constraint nodes to the variable nodes. The messages $m_{i \to a}$ are initialized based on beliefs $b_i$ of a received codeword. The messages $m_{a \to i}$ are generated by overshooting the messages $m_{i \to a}$ at the constraint nodes. The beliefs $b_i$ are updated at the variable nodes using the messages $m_{a \to i}$. The codeword is outputted if found, otherwise, the messages $m_{i \to a}$ are updated using a correction for the overshooting.

16 Claims, 6 Drawing Sheets

300

500

METHOD AND SYSTEM FOR DECODING GRAPH-BASED CODES USING MESSAGE-PASSING WITH DIFFERENCE-MAP DYNAMICS

FIELD OF THE INVENTION

This invention relates generally to decoders, and more particularly to decoding graph-based codes, including low-density parity-check (LDPC) codes, using message-passing decoders.

BACKGROUND OF THE INVENTION

Problems with Standard BP Decoders of LDPC Codes

Properly designed low-density parity-check (LDPC) codes, when decoded using belief propagation (BP) decoders, can achieve near Shannon limit performance in the so-called "water-fall" regime where the signal-to-noise ratio (SNR) is near the code threshold. Numerous BP decoders are known in the prior art. The U.S. Patent Database reveals over 500 hundred related patents and applications.

Prior art BP decoders are instances of message-passing methods that operate on a graphical representation known as a "factor graph," see F. R. Kschischang, B. J. Frey, and H.-A. Loeliger, "Factor Graphs and the Sum-Product Algorithm," IEEE Transactions on Information Theory, vol. 47, pp. 498-519, 2001. BP decoders pass "messages" between "variable nodes" and "constraint nodes" in the factor graph, and update probabilities ("beliefs") as to what a decoded codeword should be. Herein, "belief" is a term of art that is universally used to describe BP decoders. The major characteristics that distinguish different BP decoders are how messages and beliefs are iteratively updated.

Two versions of BP decoders are considered standard: the "min-sum" (or equivalent "max-product") BP decoder and the "sum-product" BP decoder. The min-sum decoder is optimal in the sense that it always returns the most likely transmitted codeword, when the factor graph representing the code is a tree. Unfortunately, the factor graphs for good codes invariably contain cycles, and in the presence of cycles, the min-sum BP decoder becomes sub-optimal.

Sub-optimal sum-product BP decoders nevertheless achieve near Shannon limit performance for good graph-based codes in the waterfall regime, but unfortunately, the same is not true in the high-SNR regime. In the high-SNR regime graph-based codes paired with sum-product or min-sum BP decoders often suffer from an "error floor" phenomena, whereby the decoder error rate improves only slowly as the SNR increases. The error floor is a significant problem for applications that require extremely high reliability for high bit densities and data rates. It limits the applicability of current generation graph-based codes in such applications, which include magneto-optic data storage, and fiber-optic communications.

Error floors in graph-based codes using BP decoders are widely believed to result from structures in the code that go under the names "near-codewords," "pseudo-codewords," "instantons," "absorbing sets," and "trapping sets," see T. Richardson, "Error Floors of LDPC Codes," Proceedings of the $41^{st}$ Allerton Conference on Communications, Control, and Computing, 2003. Error patterns resulting from channel transmission that strongly overlap these patterns are uncorrectable by the decoder.

Approaches to improve the error floor, while maintaining good water-fall behavior, can be categorized in two groups. One group constructs codes that have fewer trapping sets, and therefore improved error floors, when decoded using standard BP decoders. The number of the trapping sets, and therefore the error floor is improved by, e.g., constructing codes with fewer short cycles in the factor graph. One can also consider special classes of LDPC codes, such as EG-LDPC codes, or generalized LDPC codes that have fewer trapping sets. However, for many applications, specified codes, or codes of specified blocklengths and rates, may be required, and this approach may not be possible to implement because there may be no way to construct codes meeting the required specifications that also have good error floor behavior when decoded using standard BP decoders.

The other group of approaches to improving the error floor behavior, related to the present invention, improves the decoder. This approach is logical because random regular LDPC codes have (with high probability) excellent distance properties, and therefore, would not have error floors if the decoder used optimal maximum-likelihood (ML) decoding. (Note however that optimal decoders are normally too complex to be practical.)

For instance, if the trapping sets of a particular code are enumerated, a "bi-mode syndrome-erasure decoder" can improve the error floor behavior, see Y. Han and W. E. Ryan, "Low-floor decoders for LDPC Codes," Proceedings of the $45^{th}$ Annual Allerton Conference on Communications, Control, and Computing 2007, pp. 473-479. However, for many codes the enumeration of the trapping sets is itself an extremely challenging task.

Another improved decoder is the mixed-integer linear programming (MILP) decoder, which requires no information about trapping sets and approaches ML performance, but has a large decoding complexity. To deal with the complexity of the MILP decoder, a multistage decoder can be used, see Y. Wang, J. S. Yedidia, and S. C. Draper, "Multi-stage Decoding Via Mixed-Integer Adaptive Linear Programming," Proceedings of the IEEE International Symposium on Information Theory, 2009, pp. 2151-2155. The multistage decoder combines fast but poor-performing decoders with more powerful, but slower MILP decoders so that one can obtain a decoder that performs as well as the MILP decoder and with a high average throughput. Nevertheless, the multistage decoder has considerable practical difficulties, in that it requires multiple decoders, and the worst-case throughput is as slow as the MILP decoder.

Therefore, it is desired to provide practical BP decoders for LDPC codes that have an improved error floor when compared with standard BP decoders, but with comparable complexity, and no significant disadvantages.

The Divide and Concur Constraint Optimization Method

Our invention, described below, is motivated in part by a method described by Gravel and Elser, "Divide and Concur: a General Approach to Constraint Satisfaction," Phys. Rev. E 78, 036706, 2008, hereinafter D&C.

The motivation of Gravel and Elser was to solve complex computational problems, such as the problem of reconstructing the shapes of macromolecules in x-ray crystallography. Other applications investigated using the D&C method relate to protein folding, finding ground states of spin glasses, satisfiability testing, protein structure prediction, Ramsey numbers, solving diophantine equations, and even solving Sudoku puzzles. Many of those applications are NP-complete problems. Another of their motivations was to find improved solutions to some old and well-studied optimization problems, such as sphere packing.

The D&C method is a solution technique for constraint satisfaction problems that have N variables and M constraints. Each constraint involves a subset of the N variables.

The objective is to determine a configuration of the N variables such that all M constraints are satisfied. Instead of working directly with variable values, the D&C method instead is concerned with the dynamics of "replicas" of the variables. For each variable involved in a particular constraint, a replica of that variable is generated. The number of replicas of a particular variable equals the number of constraints that variable is involved in.

D&C uses "divide projections" and "concur projections." During a divide projection, replica values are modified, by as small a change as possible, such that each constraint is locally satisfied. During a concur projection, (possibly different) replicas of the same variable are forced to equal each other by averaging their values.

A key idea in the D&C algorithm is to avoid "short cycles" (or "traps") in the dynamics through the use of a "difference map" (DM) combination of "divide" and "concur" projections at each iteration.

Let r be the vector containing all the values of replicas of all variables. This vector can be partitioned into mutually exclusive sets in two distinct ways. First, it can be partitioned into sets of replicas corresponding to each constraint. We use $r_{(a)}$ to denote the vector of replica values of all the replicas associated with a constraint a, where a can take on integer values between 1 and M. Second, it can be partitioned into a set of replicas corresponding to each variable. We use $r_{[i]}$ to denote the vector of replica values of all replicas associated with a variable i, where i can take on integer values between 1 and N.

The "divide projection" $P_D$ forces all constraints to be satisfied, by changing the replica values $r_{(a)}$ as little as possible, and is applied independently to each set $r_{(a)}$ for a from 1 to M. After application of the divide projection, replicas of the same variable do not necessarily agree with one another.

The "concur projection" $P_C$ equalizes the replicas of the same variable and is applied independently to each set $r_{[i]}$ for i from 1 to N. After application of the concur projection, replicas of the same variable agree with one another but the constraints are not necessarily all satisfied.

A strategy is needed to combine the two projections to find a set of replica values that satisfy all constraints, and at the same time ensure that all replicas associated with each variable are equal. Perhaps the most obvious way to use the formalism of replicas and the divide and concur projections is a straightforward alternation between the two projections. This "alternating projections" approach works well for convex constraints, but otherwise sometimes gets "stuck" in short cycles that do not correspond to correct solutions.

FIG. 1 illustrates an example where the alternating projections approach fails. In the figure, there are only two replicas represented by the x- and y-values. The diagonal line represents the requirement that replica values are equal, while the points A and B correspond to the two pairs of replica values that satisfy the other constraints. The only solution that satisfies the constraints and the requirement that the replicas are equal is at point A. Say that the replica values are initialized to those corresponding to point D. If one applies alternating projections, the starting point D is first projected to the nearest pair of values that satisfies the constraints. This is point B. Application of the concur projection bring the next update to the nearest pair of replica values along the solid line, i.e., point C. Henceforth, alternating projection causes the pair of replica values to be stuck in the short cycle (B ↔ C), and the true solution at A is never found.

The difference map (DM) dynamics improves upon the alternating projections strategy by modifying the combination of the divide and concur projections in a way that turns short cycles into "repellers." The dynamics of the DM for a single iteration is a three step process.

In the first step, the replicas move twice the desired amount indicated by the divide projection. Their new values are now called "overshoot" values of the replicas.

In the second step, the concur projection is applied to the overshoot values of the replicas to obtain "concurred" values of the replicas.

In the third step, the concurred values of the replicas are corrected to obtain the replica for the next iteration by subtracting the amount that the replicas values were "overshoot" in the first step.

The dynamics of the DM are illustrated in FIG. 2. The scenario depicted in the figure is the same as in FIG. 1. Thus, if one were to initialize replica values at $r_1$ and apply alternating projections, then the dynamics get stuck in the cycle between B and $r_1$. The figure instead illustrates what happens if the replicas are initialized to $r_1$ but the DM is applied. The DM dynamics repels one from the cycle and moves to $r_2$, (via the three steps denoted with dashed lines $r_1^{over}$, $r_1^{conc} = r_1$ and $r_2$), and then moves to $r_3$, and ends at $r_4 = r^*$, which corresponds to the solution at A. The sequence of calculations and updated values for this example are tabulated in Table I, below.

TABLE I

| t | $r_t$ | $P_D(r_t)$ | $r_t^{over}$ | $r_t^{conc}$ |
|---|-------|-----------|--------------|--------------|
| 1 | (2, 2) | (3, 1) | (4, 0) | (2, 2) |
| 2 | (1, 3) | (3, 1) | (5, −1) | (2, 2) |
| 3 | (0, 4) | (0, 0) | (0, −4) | (−2, −2) |
| 4 | (−2, 2) | (0, 0) | (2, −2) | (0, 0) |
| 5 | (−2, 2) | | | |

Of course, DM might get caught in more complicated cycles or "strange attractors" and never find an existing solution; but least it does not get caught in simple local cycles.

SUMMARY OF THE INVENTION

The embodiments of the invention provide belief propagation (BP) decoders for low-density parity-check (LDPC) that significantly improve the error floor compared to standard belief propagation (BP) decoders.

Our decoders are motivated by the idea that the "trapping sets" that cause poor error floor performance in standard BP decoders are related to the "traps" of iterated projection algorithms, and therefore our decoders use the "difference map" idea from the DC method to create decoders that avoid these traps and have improved error floor performance. Our decoders come in two embodiments.

One embodiment more closely follows the ideas of the DC iterative constraint satisfaction process, but with alterations necessary to create an error-correcting decoder. This embodiment has good error floor behavior, but requires a large number of iterations to determine a codeword, and can return codewords that are not the most likely ones. These are called "undetected errors." We refer to this BP decoder as a divide and concur (DC) belief propagation (DCBP) decoder.

Another embodiment of the BP decoder uses updating rules that are similar to the standard "min-sum" or "sum-product" BP decoder but with important alterations based on the "difference map" (DM) idea from the Divide and Concur method. This "difference map belief propagation" (DMBP) decoder can dramatically improve the error floor with complexity comparable to that of standard BP decoders, on both additive white Gaussian noise, and binary symmetric channels.

DETAILED DESCRIPTION OF THE PREFERRED EMBODIMENT

Figure 1:
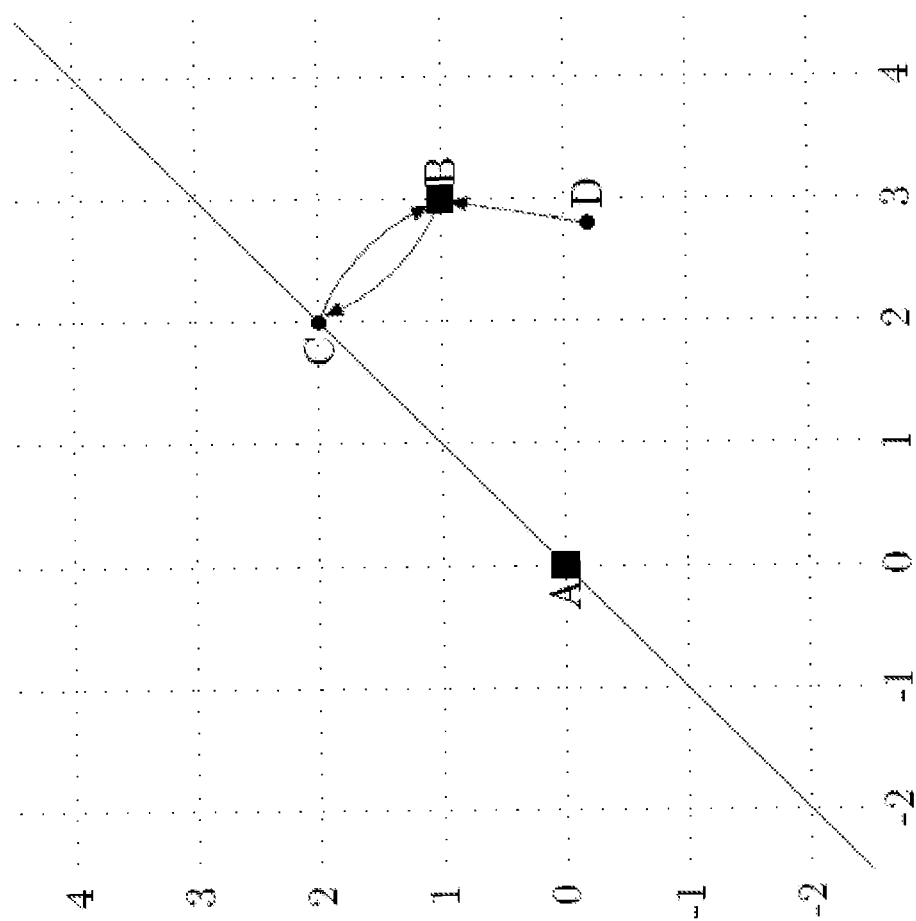
FIGS. 1-2 are schematics of a divide and concur process as known in the prior art.
Figure 2:
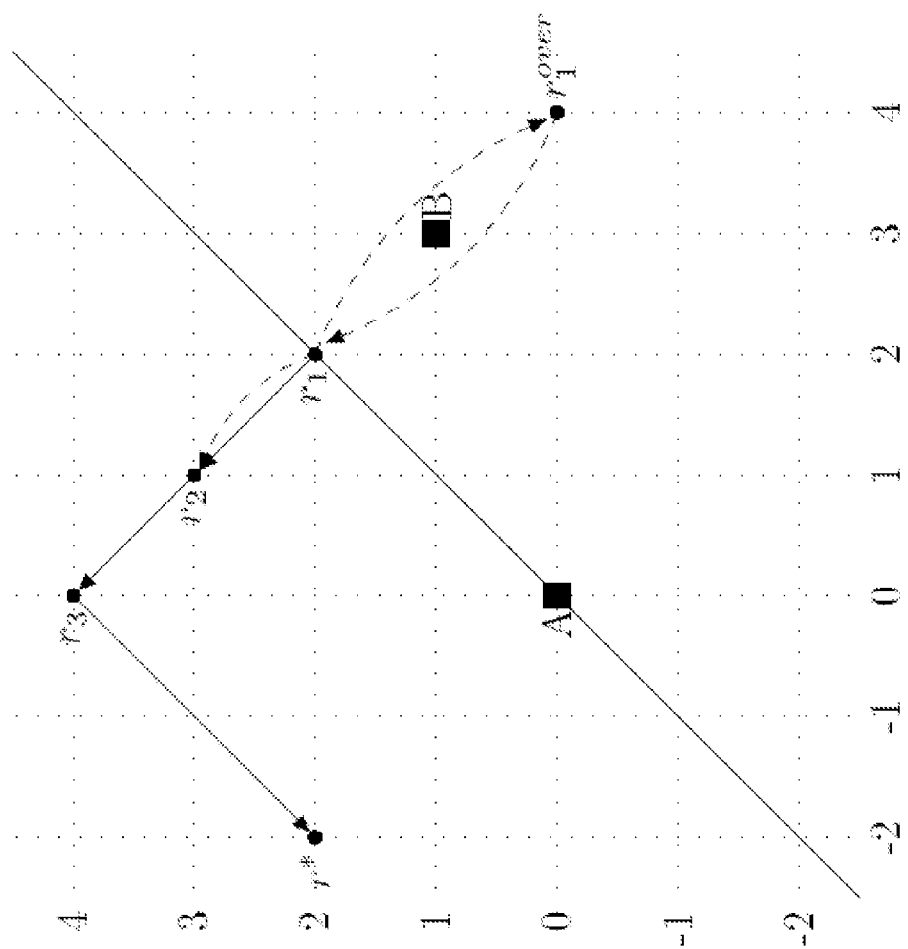

The embodiments of our invention provide methods for decoding graph-based codes, including low-density parity check (LDPC) codes, using novel belief propagation (BP) decoders. The codes can be used to store and communicate data. More specifically, our invention is well suited for high-density storage, and high data rates, such as magneto-optic storage media, and fiber-optic communication systems.

Because we have done extensive work on LDPC codes and BP decoders, see U.S. Pat. Nos. and Publications 7,376,173, 7,373,585, 7,191,376, 7,103,825, 7,103,818, 6,857,097, 6,771,197, 20080316069, 20080235515, 20080052594, 20070217432, 20070174633, 20060123241, 20060048038, and numerous scientific papers, we were intrigued whether any of the principles of the D&C method could be applied to LDPC codes and BP decoders. We note that there is nothing in the conventional D&C method that anticipates the elements of the BP decoders of our invention.

We were particularly curious whether the way that traps are avoided by D&C could solve the problem plaguing standard BP decoders, namely the trapping sets that lead to unacceptable error floors.

We wondered whether D&C could be adapted to the decoding problem by introducing parity check constraints. However, we found in trying to construct a decoder based on D&C that even more important than the parity check constraints was an "energy" constraint that takes account of evidence provided by channel observations, a type of information not present in pure constraint satisfaction problems.

In our DCBP decoder, the energy constraint is needed to enforce that a correlation between channel observations, i.e., the received signal, and a desired codeword should be at least some minimal amount. The energy constraint ensures that during the decoding process the "candidate solution" does not "wander" too far from the actual channel observation.

We also wondered whether the DM concept in D&C could be adapted for the standard min-sum or sum-product BP decoder setting, to construct an improved min-sum or sum-product BP decoder that avoided traps. We have therefore invented a way to convert and adapt the difference map idea to a BP decoder to provide a difference map belief propagation (DMBP) decoder. The DMBP decoder is a min-sum or sum-product BP decoder, but with modified dynamics. Our DMBP decoder improves the error floor substantially when compared with standard min-sum or sum-product belief propagation (BP) decoders.

D&C as a Message-Passing Method

To construct a BP decoder using the ideas of the D&C method, we needed first to reconstruct D&C using the formalism of a message-passing method. Recall that a BP decoder passes "messages" on a factor graph, which at first sight is very different from the updating of replica values that is performed in the D&C method. The "messages" and "beliefs" we define to accomplish D&C are similar to those in a conventional BP decoder, however, the message-update and belief-update rules are different.

Figure 3:
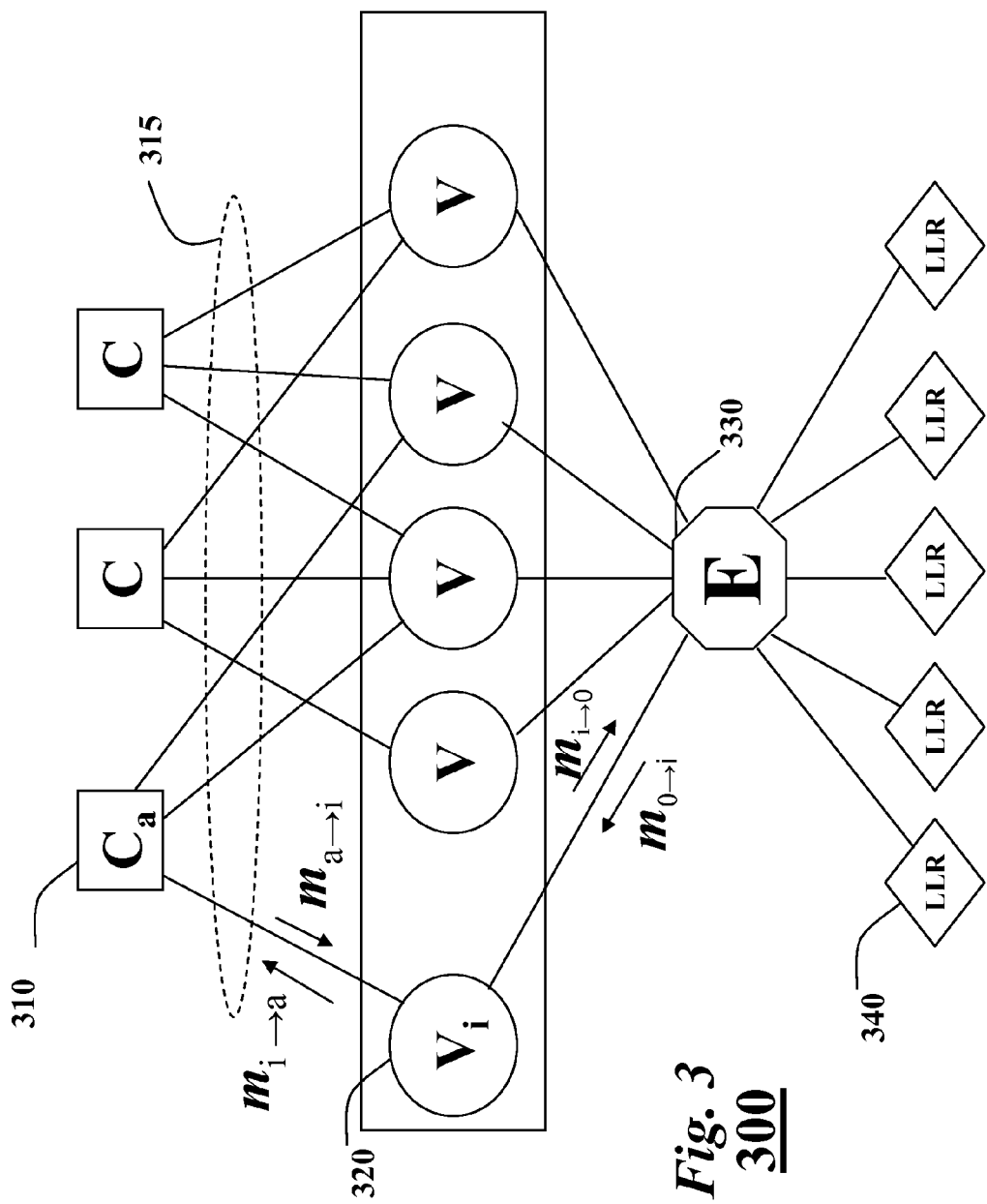
FIG. 3 is a factor graph for a divide and concur belief propagation (DCBP) decoder according to embodiments of the invention.

As shown in FIG. 3, we construct a bi-partite factor graph 300. In our factor graph, each valid configuration is given the same weight, and invalid configurations have zero weight. Our factor graph includes constraint nodes indexed by a and variable nodes indexed by i. The constraint nodes are either parity check constraint nodes 310 or a single energy constraint node 330. The variable nodes are either "hidden" variable nodes that represent the codeword bits 320, or "observed" variable nodes that represent the log-likelihood ratios 340 obtained from the channel evidence for each bit.

Each variable node is connected to associated constraints by an edge. On each edge there are two messages, one from the constraint node adjoining the edge to the variable node adjoining the edge, and one in the other direction. In FIG. 3, we denote some of the messages from the variable node representing codeword bit i by arrows. The set of edges 315 that connect codeword bits 320 and parity check constraints 310 determine the code.

In most BP decoders, the "belief" usually indicates a probability, or a log-likelihood ratio, for a variable node having a particular value. In our DCBP decoder, described in more detail below, we make a mapping of codeword bits of value 0 or 1 to symbols of value +1 or −1 respectively. We then allow the "belief" of a bit to have any real value, with more positive values corresponding to a greater likelihood of the bit has value 0, and more negative values corresponding to a greater likelihood that the bit has value 1.

Perhaps surprisingly, we identify the D&C replica values with messages passed along the edges of our graph. We denote as $r_{[i]a}(t)$ the value of the replica on the edge joining variable i to constraint a at the beginning of iteration t. We similarly denote the "overshoot" value of the same replica as $r_{[i]a}^{over}(t)$ and the "concurred" value as $r_{[i]a}^{conc}(t)$. In the corresponding language of messages, $r_{[i]a}(t)$ is denoted $m_{i \to a}(t)$, the outgoing message from variable node i to constraint node a at iteration t.

In the first step of the D&C method as described above, replica values are updated to overshoot values by moving twice the amount indicated by the divide projection. We defined overshoot conventionally to mean to shoot or pass over, or beyond so as to miss. We deliberately overshoot the target value, because that overshooting, in combination with the later correction, functions to avoid getting stuck in local traps.

Because overshoot messages are computed locally at a constraint node as a function of incoming messages, we can think of the overshoot values $r_{[i]a}^{over}(t)$ as the outgoing messages from node a, i.e., $m_{a \to i}(t)$. The set of all outgoing messages from node a at time t is denoted $m_{a \to}$, The set of all incoming messages $m_{\to a}(t)$ is analogously defined.

The second step of the D&C method applies the concur projection to the overshoot replicates to obtain "concurred" replica values $r_{[i]a}^{conc}(t)$. We can think of the concurred values as "beliefs" $b_i$, determined from all incoming messages.

In standard BP, beliefs are also functions of all incoming messages. However, while in standard min-sum BP the belief is a sum of all incoming messages, in D&C, the concurred replica is an average:

$$b_i(t) = P_C^i(r_{[i]}(t)) = \frac{1}{|M(i)|} \sum_{a \in M(i)} m_{a \to i}(t),$$

where M(i) is a set of constraints to which variable i is subject.

The third step of D&C produces the replica values for the next iteration by correcting the overshoot. Specifically, we subtract half the difference between the outgoing and incoming messages from the belief $b_i(t)$, formally $$m_{i \to a}(t+1) = b_i(t) - \frac{1}{2}[m_{a \to i}(t) - m_{i \to a}(t)]. \quad (1)$$

We experimented with replacing the predetermined parameter ½ in equation (1) with a more general parameter λ, but found that the choice λ=½ gave the best results.

We note that the next outgoing message also depends on the value of the same message at the previous iteration, which is not the case for standard min-sum BP where the ordinary update rule is $$m_{i \to a}(t+1) = b_i(t) - m_{a \to i}(t). \quad (2)$$

The overall structure of standard min-sum BP and the D&C method as presented in the language of BP is similar. In both, beliefs are iteratively updated by incoming messages from the constraint nodes, which in turn depend on the incoming messages from the variable nodes. The differences, as in all variants of different BP decoders, are in the specific forms of the message-update and belief-update rules, and the fact that a message update rule for a message out of a variable node in the D&C version of BP also depends on the value of the same message in the previous iteration. The latter difference is particularly unobvious and clearly novel.

DCBP Decoder for LDPC Codes

We call our particular version of the divide and concur method, in the context of decoding graph-based codes, DCBP decoding. We describe our approach to decoding binary LDPC codes, although generalizations to other factor graph-based codes and q-ary codes are straightforward. Searching for a codeword c is equivalent to seeking a binary sequence, which simultaneously satisfies all the single-parity check (SPC) constraints 310.

In contrast to standard constraint satisfaction problems, where any valid configuration will do, in decoding we want to find the configuration (the codeword) that is most likely. To do this in the context of constrained satisfaction, we add one important additional constraint; an energy 330 constraint. This constraint enforces that the likelihood of the binary sequence found must equal or exceed some minimal amount. With this additional constraint, the decoding can be divided into many simple sub-problems, which can be solved independently.

Let M and N respectively be the number of SPC constraints 310 and bits of the binary LDPC code 320. Let H be a parity check matrix, which defines the code. For the purposes of illustration, we assume that the binary-phase shift keying (BPSK) signaling modulation scheme is used, mapping a binary codeword c to a sequence x of +1 and −1 symbols. The sequence x is transmitted through a channel, and received as a sequence y. It is the goal during the BP decoding to recover x from y.

The set of log-likelihood ratio (LLRs) nodes 340 in FIG. 3, corresponding to the sequence y, can be expressed as a vector L, where the ith entry of the vector L is $$L_i = \log\left(\frac{Pr[y_i \mid x_i = 1]}{Pr[y_i \mid x_i = -1]}\right).$$

The most likely value of x, given y, is a sequence of ±1's that satisfies all the SPC constraints 310 while minimizing the energy E, defined as $E = -\Sigma L_i x_i$. Instead of directly minimizing the energy, we define an energy constraint, which requires that the energy be less than some maximum amount $E_{max}$. Our original idea was to make $E_{max}$ sufficiently negative so that only the most likely sequence could satisfy all the constraints.

To summarize, as shown in FIG. 3, we have N variables $x_k$ 320, and M+1 constraints, of which M are SPC constraints 310, and one energy constraint 330

$$-\sum_i L_i x_i \leq E_{max}$$

where different choices of the parameter $E_{max}$ result in different decoders. For a low-density parity check code, each SPC constraint involves only a small number of codeword bit variables, but the energy constraint involves all codeword bit variables.

It was not obvious to us how best to select the parameter $E_{max}$. We performed experiments to search for an $E_{max}$ that optimized the performance of the decoder. Surprisingly, we discovered that the best choice of $E_{max}$ is one for which the energy constraint can actually never be satisfied:

$$E_{max} = -(1+\varepsilon)\sum_i |L_i|$$

where 0<ε<<1. Since the x values are ±1 the magnitude of the energy of any configuration is lower-bounded by $$-\sum_i |L_i|.$$

We realized that the fact that the energy constraint can never be satisfied is not a problem for DCBP because of the termination criterion we choose. The decoder terminates when it finds a codeword that satisfies all the SPC constraints 310, regardless of whether the energy constraint 330 is satisfied. Thus the role of the energy constraint is to keep beliefs substantially the same as the symbols y of the received codeword.

To explain all the details of the overall DCBP decoder, we now explain how we construct divide and concur projections for LDPC decoding.

Divide and Concur Projections for LDPC Decoding

In the following, we partition the overall divide projection $P_D$ into a set of M+1 projections $P_D^a$. Each projection operates independently on the vector of the messages incoming to constraint node a, $m_{\to a}(t) = \{m_{i \to a}(t): i \in N(a)\}$ and outputs a vector of projected messages $P^a{}_D(m_{\to a}(t))$, with the same dimensionality.

The output vector is as near as possible to the original messages, $m_{\to a}(t)$, while satisfying the $a^{th}$ constraint. Single-parity check (SPC) constraints 310 require that the variables involved in a constraint are all ±1 and that an even number are −1's. For each SPC constraint, we perform the following steps.

Assign a "hard" decision $h_{ia}=1$ if $m_{i \to a} \geq 0$, and $h_{ia}=-1$ otherwise.

Check if $h_a$ has an even number of −1's. If true, return $P^a{}_D(m_{\to a})=h_a$.

Else, if $h_a$ has an odd number of −1's, let $v=\text{argmin } |m_{i \to a}|$. For a binary symmetric channel, several messages can have the same minimum. In this case, we randomly select one, and use its index as $v$.

Invert $h_{va}$, i.e., if $h_{va}=-1$, set it to 1, and if $h_{va}=1$, set it to −1. Then return $$P^a{}_D(m_{\to a})=h_a.$$

For the energy constraint we perform the following steps. First, recall that the energy constraint is $$-\sum_{i=1}^{N} x_i L_i \leq E_{max}.$$

This implies a divide projection on the vector of messages $m_{\to 0}(t)$, performed as follows.

If the energy constraint is satisfied by the current messages $M_{\to 0}(t)$, return the current messages, $P^0{}_D(m_{\to 0}(t))=m_{\to 0}(t)$. (Recall however that for the $E_{max}$ specified above the energy constraint 330 is never satisfied.)

If the energy constraint is not satisfied by the current messages, find the $h_0$, which is the closest vector to $m_{\to 0}(t)$ and temporarily satisfies the energy constraint. The $i^{th}$ component $h_{i0}$ is $$h_{i0} = m_{i \to 0}(t) - \frac{L_i \left( \sum_i L_i m_{i \to 0}(t) + E_{max} \right)}{\sum_i L_i^2},$$

and return $P^0{}_D(m_{\to 0})=h_0$.

The concur projection $P_C$ can be partitioned into a set of N projections $P^i{}_C$, one for each variable $i$ for $i$ in the range 1 to N. Each projection operates independently on the vector of messages $m_{\to i}(t)=\{m_{a \to i}(t): a \in M(i)\}$, and returns the belief $b_i$, which is the average over the components of the vector $m_{\to i}$.

B. DCBP Decoder

Figure 4:
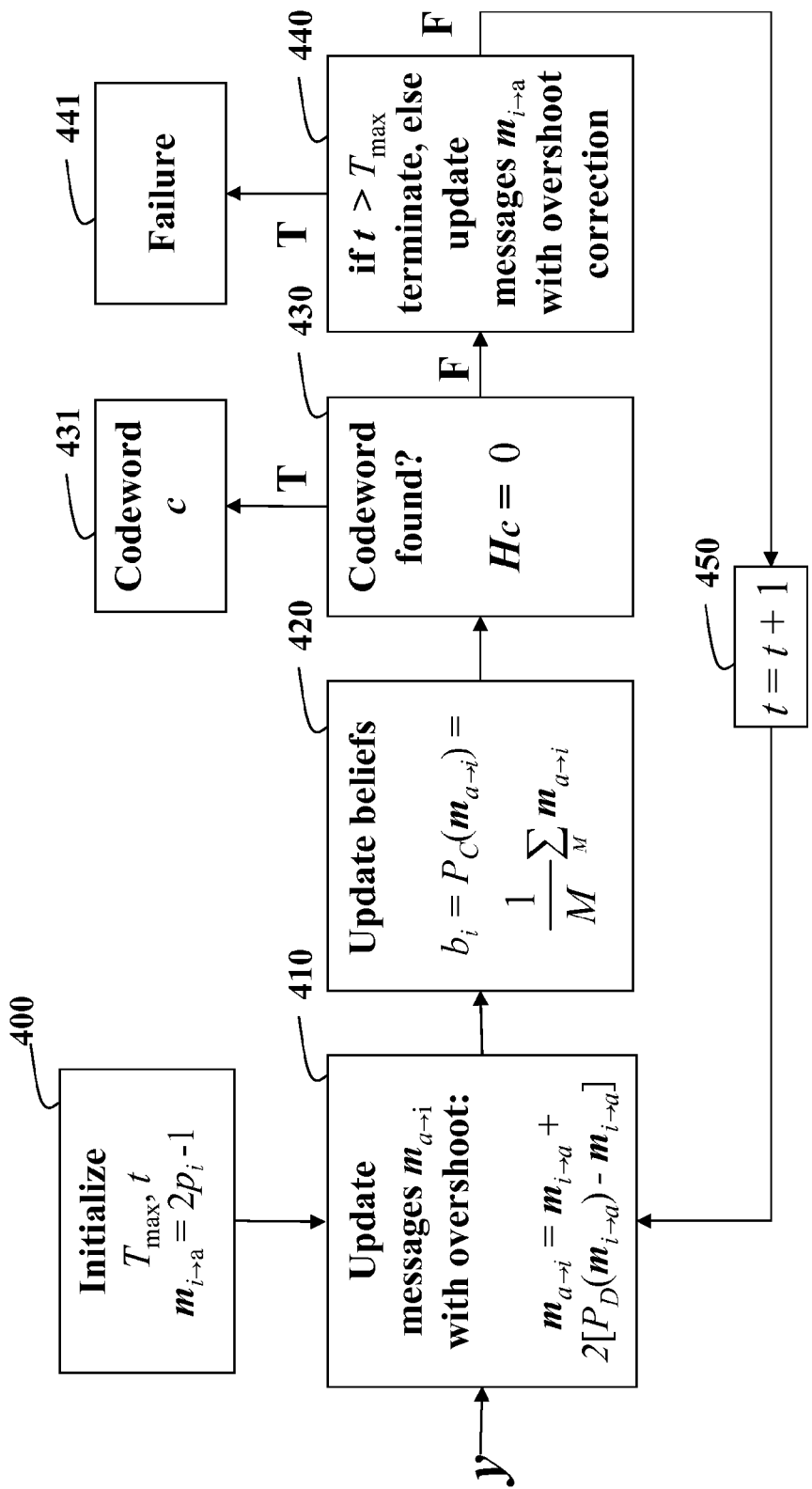
FIG. 4 is a flow diagram of the DCBP decoder according to embodiments of the invention.
Figure 6:
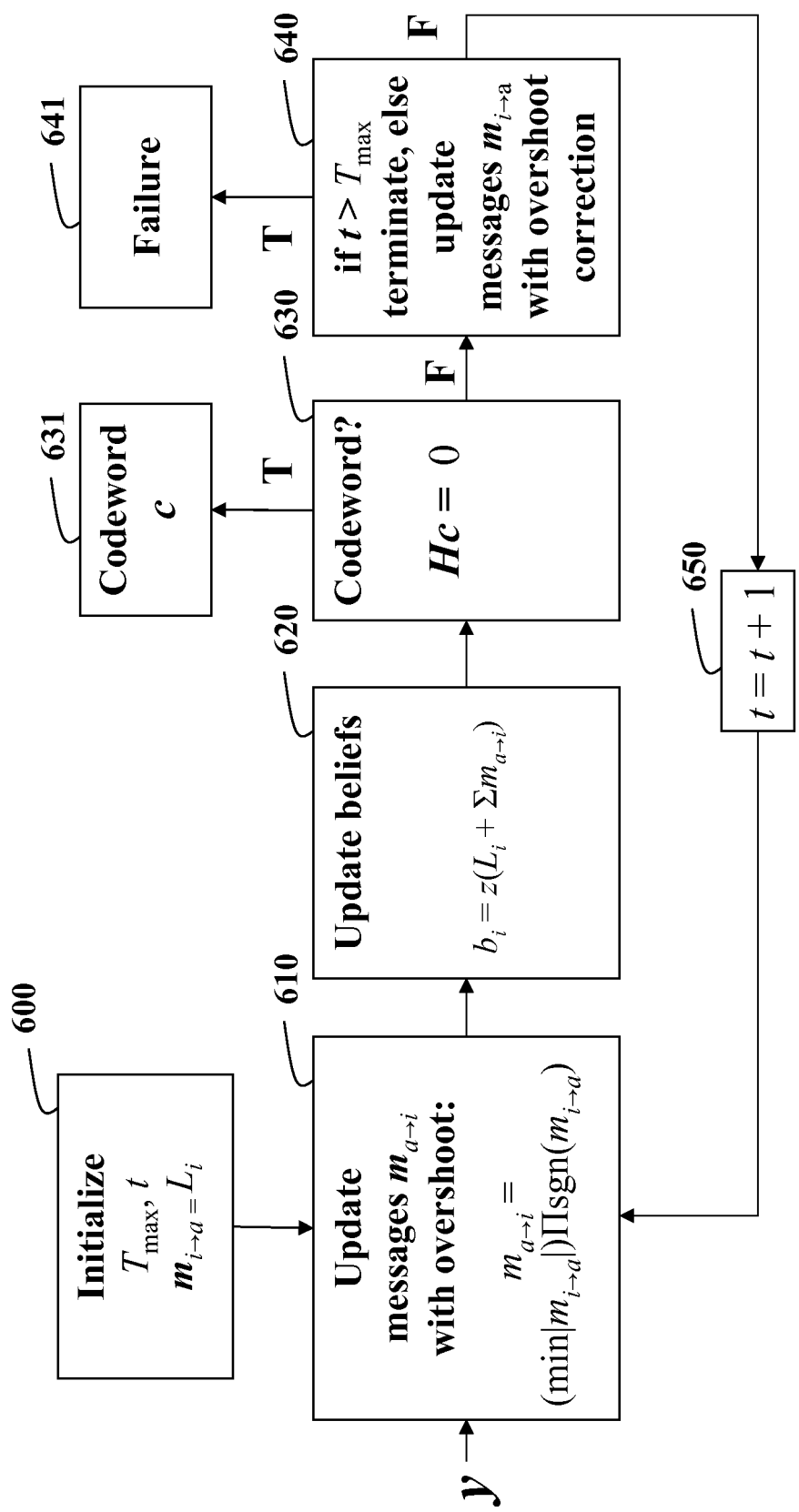
FIG. 6 is a flow diagram of the DMBP decoder according to embodiments of the invention.

FIG. 4 shows the steps of the DCBP decoder according to embodiments of the invention. The steps of this method, as well as the method shown in FIG. 6, are performed in a processor. The processor can include memory and input/output interfaces as known in the art. The method can also be implemented in an application specific integrated circuit (ASIC).

Initialization 400:

Set the maximum number of iterations to $T_{max}$ and the current iteration t to 1, and set messages $m_{i \to a}(t=1)=2p_i-1$, for all codeword bit nodes i and constraint nodes a neighboring variable node i, i.e., $a \in M(i)$. Here $p_i$ is an initialization parameter indicating the belief that the $i^{th}$ transmitted symbol $x_i$ is 1. One good choice for the initialization parameter is given by the formula $$p_i = \exp(L_i)/(1+\exp(L_i)).$$

Update Messages from Constraints to Variables with Overshoot 410:

The messages $m_{\to a}$ incoming to constraint a are used to determine the outgoing messages $m_{a \to}$, using the overshoot formula $$m_{a \to}(t) = m_{\to a}(t) + 2[P_D^a(m_{\to a}(t)) - m_{\to a}(t)],$$

where $P_D^a$ is the divide projection operation for constraint a.

Update Beliefs 420:

We update the beliefs at the variable nodes i using the concur projections $$b_i(t) = P_C^i(m_{\to i}(t)) = \frac{1}{|M(i)|} \sum_{a \in M(i)} m_{a \to i}(t)$$

Check if Codeword has been Found 430:

Set $c=1$, if $b_i(t)<0$, otherwise set $c=0$ if $b_i(t)>0$, and randomly set c to 0 or 1, if $b_i(t)=0$. Compute the matrix product H c. If H c=0, output c as the codeword 431 and stop.

Update Messages from Variables to Constraints with Overshoot Correction 440:

Increment $t=t+1$ 450. If $t>T_{max}$, terminate, and return failure 441. Otherwise, update the message outgoing from each variable node $m_{i \to a}$ to correct for the "overshoot" as in Equation (1), and go to Step 1.

IV. DMBP Decoder

As described above, the DCBP decoder performs reasonably well, resulting in bit-error rate (BER) performance equal to standard BP decoders, and even superior to them in the error floor regime. However, the DCBP decoder often takes many iterations to converge, and DCBP decoder errors are often "undetected" errors—convergence to a non-transmitted codeword. In contrast BP typically fails to converge rather than converging to an incorrect codeword. Extracting the concept of the difference map (DM) that is central to the D&C method, we adapt the DM to our BP decoder. The result is a novel difference-map belief propagation (DMBP) decoder. The complexity of the DMBP decoder is comparable to that of standard BP decoders, but has a BER significantly lower than standard BP decoders in the error-floor regime.

Figure 5:
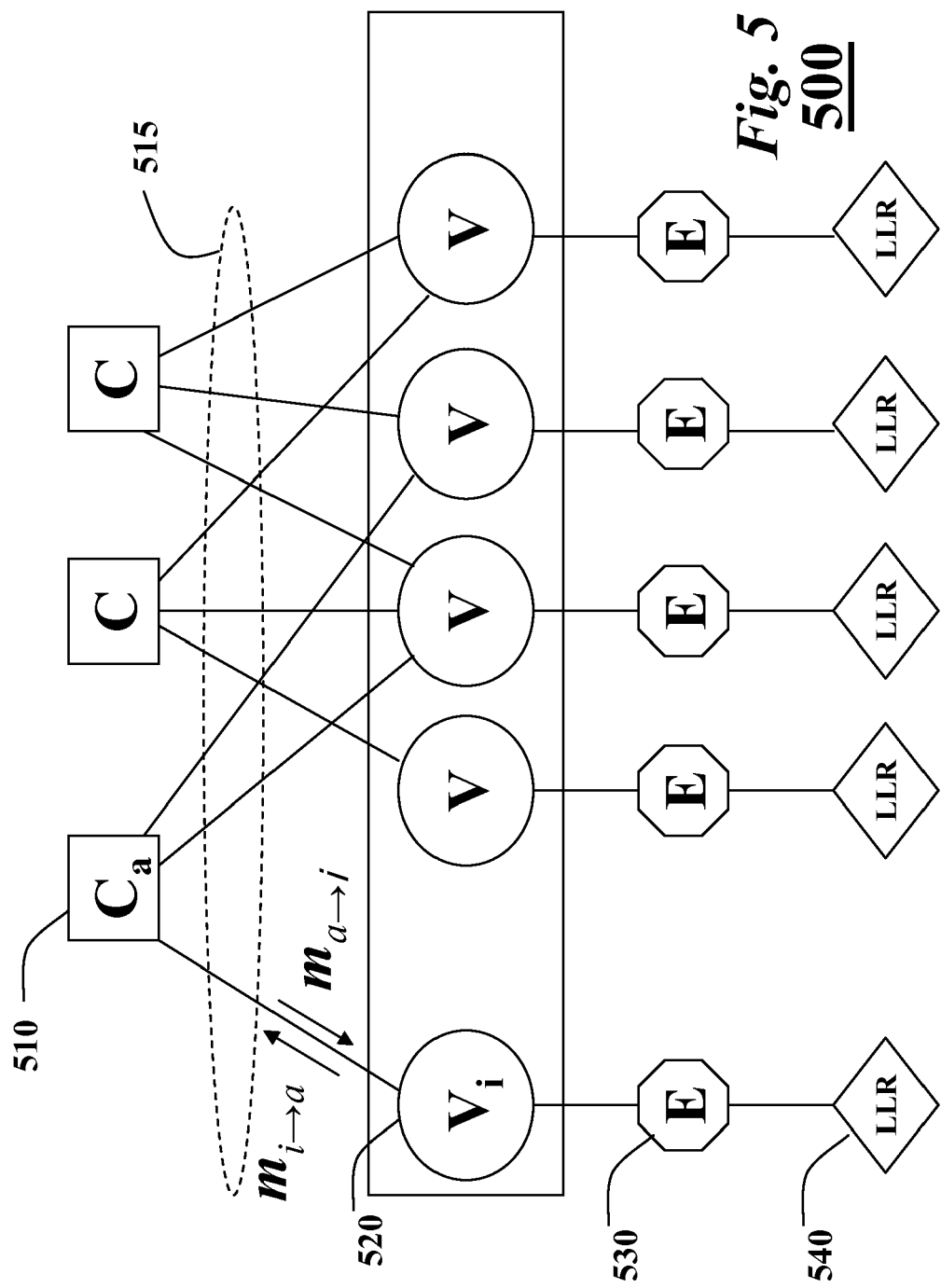
FIG. 5 is a factor graph for a difference map belief propagation (DMBP) decoder according to embodiments of the invention.

As shown in FIG. 5, and similar to FIG. 3, we construct a bi-partite factor graph 500, essentially identical to that used in standard BP decoders. Our factor graph 500 includes parity check constraint nodes (C) 510 and codeword bit variable nodes (V) 520. Each codeword bit variable is connected to its associated constraints by an edge. The edges transfer messages. The messages are used to update beliefs as what the codeword is. The set of edges 515 that connect codeword bits and parity check constraints determine the code.

Notice that the factor graph in FIG. 5 is different from the factor graph used for the DCBP decoder shown in FIG. 3 in that each codeword bit $x_i$ is separately connected to its observed log-likelihood ratio $L_i$ 540, through a corresponding energy factor node 530. In the DCBP factor graph in FIG. 3, by contrast, there is a single energy constraint 330.

Our motivation for inventing the DMBP decoder was that BP decoders generally perform well, but seem to use something like an iterated projection strategy. We hoped that the trapping sets that cause the error-floor in conventional BP decoders are related to the "traps" that the difference map dynamics of D&C are supposed to ameliorate.

Hence, we apply the difference map (DM) idea of D&C to BP decoders. For simplicity, we describe a version of DMBP in terms of the min-sum BP decoder using messages and beliefs that correspond to log-likelihood ratios (LLR) 540. We term the resulting decoder min-sum DMBP. We note that the min-sum message update rule is much simpler to implement in hardware than the conventional sum-product rule:

$$m_{a \to i} = 2\tanh^{-1}\left(\prod_{j \in N(a) \setminus i} \tanh(m_{j \to a}/2)\right).$$

Usually, sum-product or some approximation to the sum-product BP decoders are preferred over min-sum BP decoders because of better performance. However, to our surprise, our min-sum DMBP decoder has better performance than the conventional sum-product BP decoder, as well as the analogous sum-product DMBP decoder.

We use the same notation for messages and beliefs that were used in the description of the DCBP decoder. We compare, on an intuitive level, the min-sum DMBP decoder with the DCBP decoder in terms of belief updates and message-updates at both the variable and constraint check nodes.

Min-Sum BP Update Rule with Overshoot

Beginning with the message-updates at a check node, the standard min-sum BP update rules take incoming messages $m_{i \to a}$, and determine outgoing messages according to $$m_{a \to i} = (\min_{j \in N(a) \setminus i} |m_{j \to a}|) \prod_{j \in N(a) \setminus i} \text{sgn}(m_{j \to a}), \qquad (3)$$

where $N(a) \setminus i$ is the set of variable nodes neighboring node a except for variable node i, $\text{sgn}(m_{j \to a}) = 1$ if $m_{j \to a} > 0$, $\text{sgn}(m_{j \to a}) = -1$ if $m_{j \to a} < 0$, and 0 otherwise.

The standard min-sum update, in some sense, also "overshoots" the correct solution. The standard min-sum rules for updating the message from a check node to a variable node ignore the incoming message from that variable node. The result is that messages outgoing from check nodes, at least in terms of the sign, "overshoot" the values needed to satisfy the constraint. For example, at a constraint node that has three incoming positive messages and one incoming negative message, we obtain three outgoing negative messages, and one outgoing positive message. In a very loose interpretation, and with some stretch of the imagination, this "overshoots" the "correct" solution of having an even number of negative messages. As the standard min-sum update rules for check nodes overshoot, and we need overshoot, we directly use the standard min-sum update rules for messages from parity check constraints to variables unmodified for min-sum DMBP.

Compromise Belief Update Rule

The standard min-sum BP rule for calculating the current beliefs of a particular variable node sums all messages incoming toward that variable node, including the message from the observation of the channel output. The D&C rule instead averages the incoming messages. Therefore, for DMBP we decide to use a compromise rule $$b_i = z\left(L_i + \sum_{a \in M(i)} m_{a \to i}\right), \qquad (4)$$

where z is a parameter selected to optimize decoder performance. Instead of the conventional value of z=1, we use values of z in a range 0.25 to 0.5, e.g., z=0.4. The reason for this value is that it works best for most of the codes we have tried.

Finally, for the message update rule at the variable nodes, we exactly implement the overshoot "correction" rule of D&C, i.e., the difference map (DM). Our intuitive idea is that, perhaps, the conventional BP is missing some correction, which is important to escape trapping sets, like the DM does for local traps in D&C.

FIG. 6 shows the steps of the DMBP decoder according to embodiments of the invention.

Initialization 600:

Set the maximum number of iterations to $T_{max}$ and the current iteration t to 1, and set messages $m_{i \to a}(t) = L_i$ for all i and all a ∈ M(i).

Update Messages from Constraints to Variables with Overshoot 610:

Given the messages $m_{\to a}(t)$ incoming to constraint node a, the outgoing messages $m_{a \to}(t)$ are calculated using the min-sum update rule described above in Equation (3).

Update Beliefs 620:

Beliefs $b_i(t)$ are computed at each variable node i using the compromise update rule described above in Equation (4).

Check if Codeword has been Found 630:

Construct a length-N vector c as follows. Set $c_i = 1$, if $b_i(t) < 0$, otherwise set $c_i = 0$ if $b_i(t) > 0$, and randomly set $c_i$ to 0 or 1, if $b_i(t) = 0$. If Hc=0, output c as the codeword and stop.

Update Messages from Variables to Constraints with Overshoot Correction 640:

Increment t=t+1 650. If t>$T_{max}$ terminate and return failure 641. Otherwise, update each message out of the variable nodes using the "overshoot correction" rule given in Equation (1) and go back to Step 1.

Although the invention has been described with reference to certain preferred embodiments, it is to be understood that various other adaptations and modifications can be made within the spirit and scope of the invention. Therefore, it is the object of the append claims to cover all such variations and modifications as come within the true spirit and scope of the invention.

We claim:

1. A method for decoding a code using message-passing, wherein the code is represented by a factor graph, wherein the factor graph includes variable nodes indexed by i and constraint nodes indexed by a, wherein the variable nodes and the constraint nodes are connected by edges for transferring messages $m_{i \to a}$ outgoing from the variable nodes to the constraint nodes and messages $m_{a \to i}$ incoming from the constraint nodes to the variable nodes, and wherein the messages $m_{i \to a}$ are initialized using beliefs $b_i$ of the set of variables nodes based on a received set of symbols y, and a processor for iteratively performing steps of the method, comprising the steps of:

generating the messages $m_{a \to i}$ by overshooting the messages $m_{i \to a}$ at the constraint nodes;

updating the beliefs $b_i$ at the variable nodes using the messages $m_{a \to i}$;

determining if codeword has been found;

outputting the codeword if true; and otherwise updating the messages $m_{i \to a}$ using correction for the overshooting if false, wherein the decoding is performed in a divide and concur belief propagation (DCBP) decoder.

2. The method of claim 1, further comprising:
terminating if a termination condition is reached.

3. The method of claim 1, wherein the decoding is applied in a high data rate application.

4. The method of claim 1, wherein the decoding is applied in a high-density storage application.

5. The method of claim 1, wherein the code includes symbols, and the symbols have two values or more.

6. The method of claim 1, wherein the codeword includes symbols, and wherein the factor graph has one constraint node for each parity check constraint, and one variable node for each symbol $x_i$ in the codeword c, and all the variable nodes are connected to an energy constraint node, and the energy constraint node is connected to a set of log-likelihood ratio (LLR) nodes $L_i$.

7. The method of claim 6, wherein the symbols are bits having values 0 or 1, and further comprising:
mapping 0 to +1, and mapping 1 to −1.

8. The method of claim 1, wherein next messages $m_{i \to a}$ from the variable nodes to the constraint nodes depend upon a current messages $m_{a \to i}$ and the same messages $m_{i \to a}$ during previous iterations.

9. The method of claim 8, wherein next messages in $m_{i \to a}$ from the variable nodes to the constraint nodes are updated by subtracting a difference between the messages $m_{i \to a}$ and the messages $m_{a \to i}$ from the belief $b_i$ according to $$m_{i \to a}(t+1) = b_i(t) - \lambda[m_{a \to i}(t) - m_{i \to a}(t)],$$

where $\lambda$ is a predetermined parameter.

10. The method of claim 9, wherein $\lambda = \frac{1}{2}$.

11. The method of claim 1, wherein each belief $b_i$ is an average $$b_i(t) = \frac{1}{|M(i)|} \sum_{a \in M(i)} m_{a \to i}(t),$$

where the variable node i is subject to the set of constraint nodes, and t represents an iteration.

12. The method of claim 6, wherein the energy constraint is $E \leq E_{max}$, where
$E_{max}$ is a parameter and $E = -\Sigma L_i x_i$.

13. The method of claim 12, wherein the parameter $E_{max}$ is set to a value such that the energy constraint is never satisfied to keep the beliefs $b_i$ substantially the same as the received symbols y.

14. The method of claim 1, wherein each belief $b_i$ is updated according to $$b_i = z\left(L_i + \sum_{a \in M(i)} m_{a \to i}\right),$$

where z is a parameter selected to optimize a performance of the decoding.

15. The method of claim 14, where the parameter z is set to a value in a range 0.25 to 0.5.

16. A decoder for decoding a code using message-passing, wherein the code is represented by a factor graph, wherein the factor graph includes variable nodes indexed by i and constraint nodes indexed by a, wherein the variable nodes and the constraint nodes are connected by edges for transferring messages $m_{i \to a}$ outgoing from the variable nodes to the constraint nodes and messages $m_{a \to i}$ incoming from the constraint nodes to the variable nodes, wherein the messages $m_{i \to a}$ are initialized based on beliefs $b_i$ based on a received set of symbols y, comprising a processor, comprising:
means for generating the messages $m_{a \to i}$ by overshooting the messages $m_{i \to a}$ at the constraint nodes;
means for updating the beliefs $b_i$ using the messages $m_{a \to i}$,
means for determining if the codeword has been found;
means for outputting the codeword if true; and otherwise
means for updating the messages $m_{i \to a}$ using correction for the overshooting if false, wherein the decoder is a divide and concur belief propagation (DCBP) decoder.

* * * * *